N. A. NIELSEN.
MEANS FOR INFLATING PNEUMATIC TIRES OF MOTOR CARS AND OTHER VEHICLES.
APPLICATION FILED MAY 21, 1913.
1,101,708.  Patented June 30, 1914.
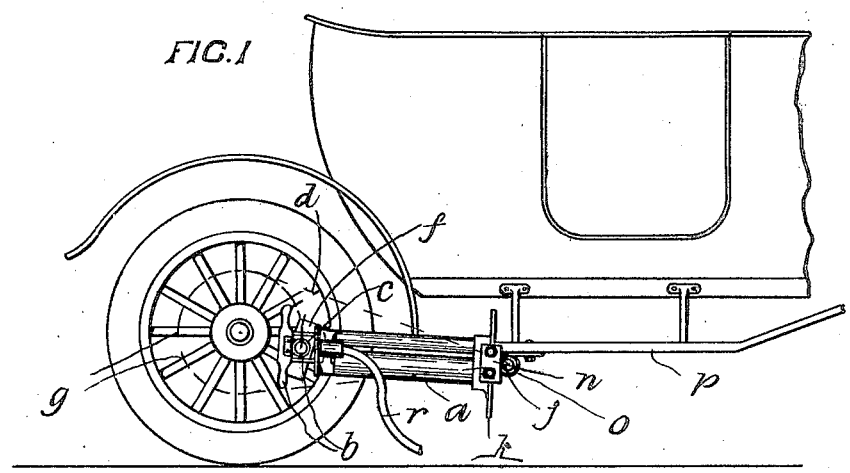
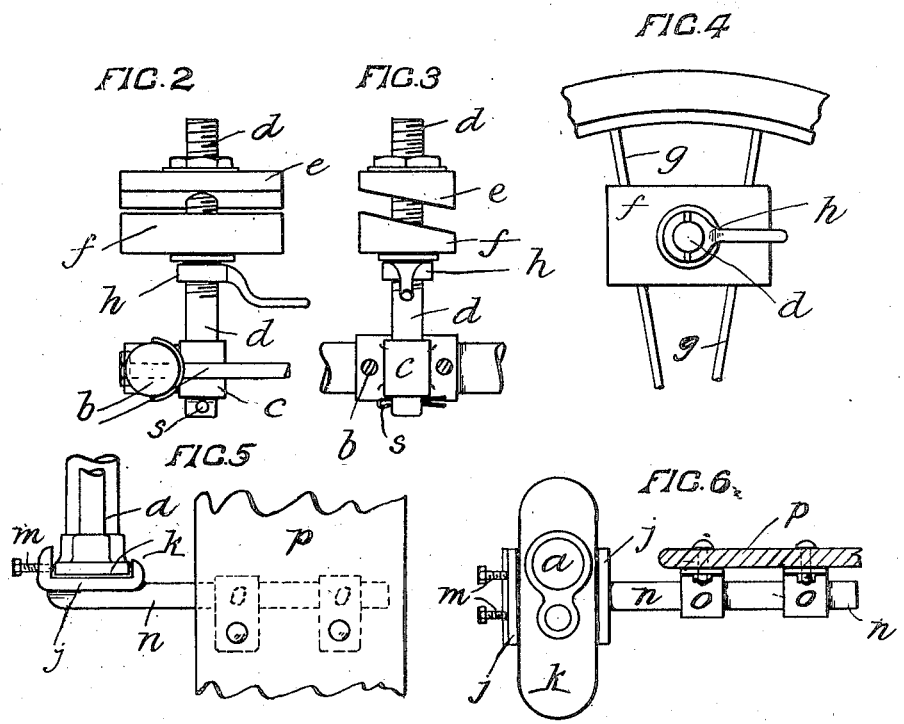

UNITED STATES PATENT OFFICE.

NIELS A. NIELSEN, OF MARTON, NEW ZEALAND, ASSIGNOR OF ONE-HALF TO WILLIAM SWAINSON MARSHALL, OF MANGARAUPI, NEW ZEALAND.

MEANS FOR INFLATING PNEUMATIC TIRES OF MOTOR-CARS AND OTHER VEHICLES.

1,101,708.   Specification of Letters Patent.   Patented June 30, 1914.

Application filed May 21, 1913.   Serial No. 768,914.

*To all whom it may concern:*

Be it known that I, NIELS ANDREW NIELSEN, subject of the King of Great Britain, residing at Marton, New Zealand, have invented a new and useful Improvement in Means for Inflating the Pneumatic Tires of Motor-Cars and other Vehicles; and I do hereby declare the following to be a full, clear, and exact description of the same.

This invention has been designed in order to provide means whereby an ordinary inflation pump may be connected to and actuated by one of the driving wheels of a stationary motor car or other vehicle in order that the pneumatic tires of the other wheels may be inflated with the expenditure of a minimum of time and trouble.

The invention relates to improvements in the apparatus employed in that known class of inflating means, in which a pump has its cylinder suspended on a pivot point on the vehicle frame and its plunger rod attached to a crank pin upon the vehicle wheel so that the rotation of the wheel will impart reciprocation to the pump plunger. The pumping operation thus performed may then be utilized to inflate the tires of the other wheels of the vehicle than that to which the pump is attached.

The invention consists in a special form of clamp for attaching the crank pin to the wheel and also in a special form of pivot pin upon which the pump cylinder may be mounted in the vehicle frame.

In the accompanying drawings suitable means for carrying out the invention have been illustrated, although others of similar principle in construction and operation may be employed without departing from the spirit of the invention.

In such drawings:—Figure 1 is a side elevation of the rear portion of a motor car with the appliances fixed ready for working. Fig. 2 is a plan. Fig. 3 an end elevation, and Fig. 4 a front elevation of a suitable form of crank pin and clamp for its attachment to a wheel, the last figure showing it upon the spokes of the wheel. Fig. 5 is a plan, and Fig. 6 a front elevation of a clip for attachment to the pump cylinder and for pivoting such cylinder upon the car footboard.

*a* represents the pump which may be of any of the ordinary forms having the plunger actuating plunger rods and handle *b* and which in this invention have attached to them a sleeve or like bearing *c* extending transversely across the handle.

*d* is the crank pin which is made of a diameter such that the sleeve bearing *c* will fit neatly thereon. The pin is screwed into the back plate *e* of a pair of clamping plates *e* and *f* the front plate of which fits loosely on the pin. These plates are adapted to lie respectively behind and in front of the spokes *g* of the wheel and to extend across two of them, as shown in Figs. 1 and 2. A hand nut *h* is screwed on to the pin so as to engage with the outside face of the plate *f* and thereby when screwed in to tighten the plates on to the wheel spokes and thus fasten the crank pin thereto. The clamp may be attached at any distance desired from the center of the wheel. The clamping plates shown in the drawings are made with their adjacent faces beveled to permit of their attachment to a wire spoke wheel in such a manner that the crank pin *d* will extend horizontally from the wheel. These faces may however be made flat when the clamps are to be used for a wheel having wooden spokes, or the same plates may be used for either form of wheel by reversing their faces upon the pin.

*j* (Figs. 5 and 6) is a clip into which the bottom end or foot plate *k* of the pump fits and in which it is jammed and held by means of the set screws *m*. The clip is attached to or formed in one with a spindle *n* extending at right angles therefrom. This spindle is adapted to fit into the bearings *o* fixed to the underside of the footboard *p* of the car so that it will be supported therein in such a manner as to be free to rock reciprocally. The pump end therefor inserted in the clip will be also supported.

It will be seen that when the crank pin *d* has been fixed to the wheel and the pump inserted in the clip *j* the pump may be suspended by passing the spindle *n* into the bearings *o* and by passing the sleeve bearing *c* over the crank pin as shown in Fig. 1. When therefore the wheel is rotated the pump plunger will be worked in and out, the pump oscillating with its clip in the bearings *o* so as to correspond with the varying angles with such bearings, assumed by the crank pin in its rotation with the wheel.

The appliances used may be readily carried in the tool box of the car and may be quickly put into working position when needed, all that is required being to clamp the crank pin upon the wheel and then to pass the spindle $n$ into its bearings and the sleeve $c$ over the crank pin and to raise the wheel from the ground a sufficient distance to enable it to rotate freely. The other three wheels of the car may then have their tires inflated, the pump tube $r$ being made sufficiently long to reach them. The appliances are then removed from this wheel and placed upon the driving wheel on the other side of the car and the first wheel in turn have its tire inflated.

If required a split pin $s$ may be passed through the outer end of the crank pin $d$ in order to prevent any liability of the plunger handle coming off the pin while working. The length of the crank pin projecting outward from the wheel may be varied by screwing the pin in or out of the clamp plate $e$ so that it may be used on cars having varying widths of mud guards.

In some cases, the pump cylinder may be attached to the crank pin on the wheel and the plunger attached to the car body without departing from the principle involved in the working of the invention.

What I do claim as my invention, and desire to secure by Letters Patent is:—

1. Means for inflating the pneumatic tires of motor vehicles comprising a crank pin threaded at its inner end, a pair of clamping plates mounted on said pin and adapted to be secured to the spokes of one of the driving wheels, a nut for clamping said plates together, an air pump having a plunger rod, a sleeve-bearing attached to said rod and fitting upon a crank pin, and means for pivotally suspending said air pump from the vehicle body.

2. Means for inflating the pneumatic tires of motor vehicles, comprising a crank pin threaded at its inner end, a pair of clamping plates mounted on said pin and adapted to be clamped to the spokes of one of the driving wheels, a nut for clamping said plates together, an air pump having a plunger rod, a sleeve attached thereto and fitting upon said crank pin, a clip adapted to receive the end of said air pump, and a spindle extending transversely from said clip, and bearings on the vehicle body for said spindle.

In testimony whereof, I have signed this specification in the presence of two subscribing witnesses.

N. A. NIELSEN.

Witnesses:
F. J. OAKLEY,
CHAS. C. HARSACK.

---

Copies of this patent may be obtained for five cents each, by addressing the "Commissioner of Patents Washington, D. C."